United States Patent
Amirghodsi et al.

(10) Patent No.: US 9,396,530 B2
(45) Date of Patent: Jul. 19, 2016

(54) LOW MEMORY CONTENT AWARE IMAGE MODIFICATION

(71) Applicant: Adobe Systems Incorporated, San Jose, CA (US)

(72) Inventors: Sohrab Amirghodsi, Seattle, WA (US); Soheil Darabi, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 83 days.

(21) Appl. No.: 14/339,716

(22) Filed: Jul. 24, 2014

(65) Prior Publication Data

US 2016/0027159 A1    Jan. 28, 2016

(51) Int. Cl.
*G06K 9/00*   (2006.01)
*G06T 5/30*   (2006.01)

(52) U.S. Cl.
CPC ........................ *G06T 5/30* (2013.01)

(58) Field of Classification Search
None
See application file for complete search history.

(56) References Cited

U.S. PATENT DOCUMENTS

| | | |
|---|---|---|
| 8,285,055 B1 | 10/2012 | Barnes et al. |
| 8,355,592 B1 | 1/2013 | Shechtman et al. |
| 8,625,927 B2 | 1/2014 | Shechtman et al. |
| 8,818,135 B1 * | 8/2014 | Goldman ............... G06T 5/005 382/254 |
| 2012/0045095 A1 * | 2/2012 | Tate ........................ G06T 5/003 382/103 |
| 2012/0120192 A1 * | 5/2012 | Alregib ..................... G06T 5/00 348/43 |
| 2013/0254688 A1 | 9/2013 | Shechtman et al. |
| 2014/0064614 A1 * | 3/2014 | Hung .................... G06T 3/4092 382/167 |

OTHER PUBLICATIONS

Barnes et al., PatchMatch: A Randomized Correspondence Algorithm for Structural Image Editing, ACM Trans. Graph. 28, 3, Article 24 (Jul. 2009), 10 pages.
Barnes, et al., "The Generalized patchMatch Correspondence Algorithm," URL: www.connellybarnes.com/work/publications/2010_generalized_pm.pdf, Jul. 24, 2014, 14 pages.
Barnes, et al., "Supplementary Material for the Generalized PatchMatch Correspondence Algorithm," URL: gfx.cs.princeton.edu/.../generalized_pm_suppl.pdf, Jul. 24, 2014, 6 pages.

* cited by examiner

*Primary Examiner* — Wesley Tucker
(74) *Attorney, Agent, or Firm* — Finch & Maloney PLLC

(57) ABSTRACT

Techniques are disclosed for generating a modified image. A source image at an original, or high, resolution is downsampled to a lower resolution. One or more mappings between different patches, or regions, of pixels within the source image or across several images are generated from the downsampled image using a patch-based sampling algorithm. Such patch-based sampling algorithms may be used find correspondences between patches of one or more images by defining a nearest-neighbor field as a function of offsets for some distance function of the patches. The mapping is then upsampled to a higher resolution for coherent regions and used to identify fill content in the source image for filling patches in other portions of the image or other images. The fill content is derived from regions of the source image corresponding to the coordinates of the source patch in the upsampled mapping.

20 Claims, 5 Drawing Sheets

LOW MEMORY CONTENT AWARE IMAGE MODIFICATION

FIELD OF THE DISCLOSURE

This disclosure relates to the field of data processing, and more particularly, to techniques for generating a modified image.

BACKGROUND

Image editing is the process of altering images by manipulating, enhancing or transforming their contents. Techniques for synthesizing both texture and complex image structures that qualitatively resemble those appearing in source images form the basis for a variety of interactive image editing tools, such as image retargeting, image completion and image reshuffling. For example, image retargeting allows images to be resized to a new aspect ratio, where the computer automatically produces a good likeness of the contents of the original image but with new dimensions. In another example, image completion allows unwanted portions of an image to be erased, and the computer automatically fills the erased region with synthesized content that plausibly matches the remainder of the image. In yet another example, image reshuffling makes it possible to grab portions of the image and move them around, and the computer automatically synthesizes the remainder of the image so as to resemble the original while respecting the moved regions. These tools can use patch-based sampling techniques for identifying patches of correspondence within images. However, some of these sampling techniques are computationally complex, and therefore can consume large amounts of both time and processing resources.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
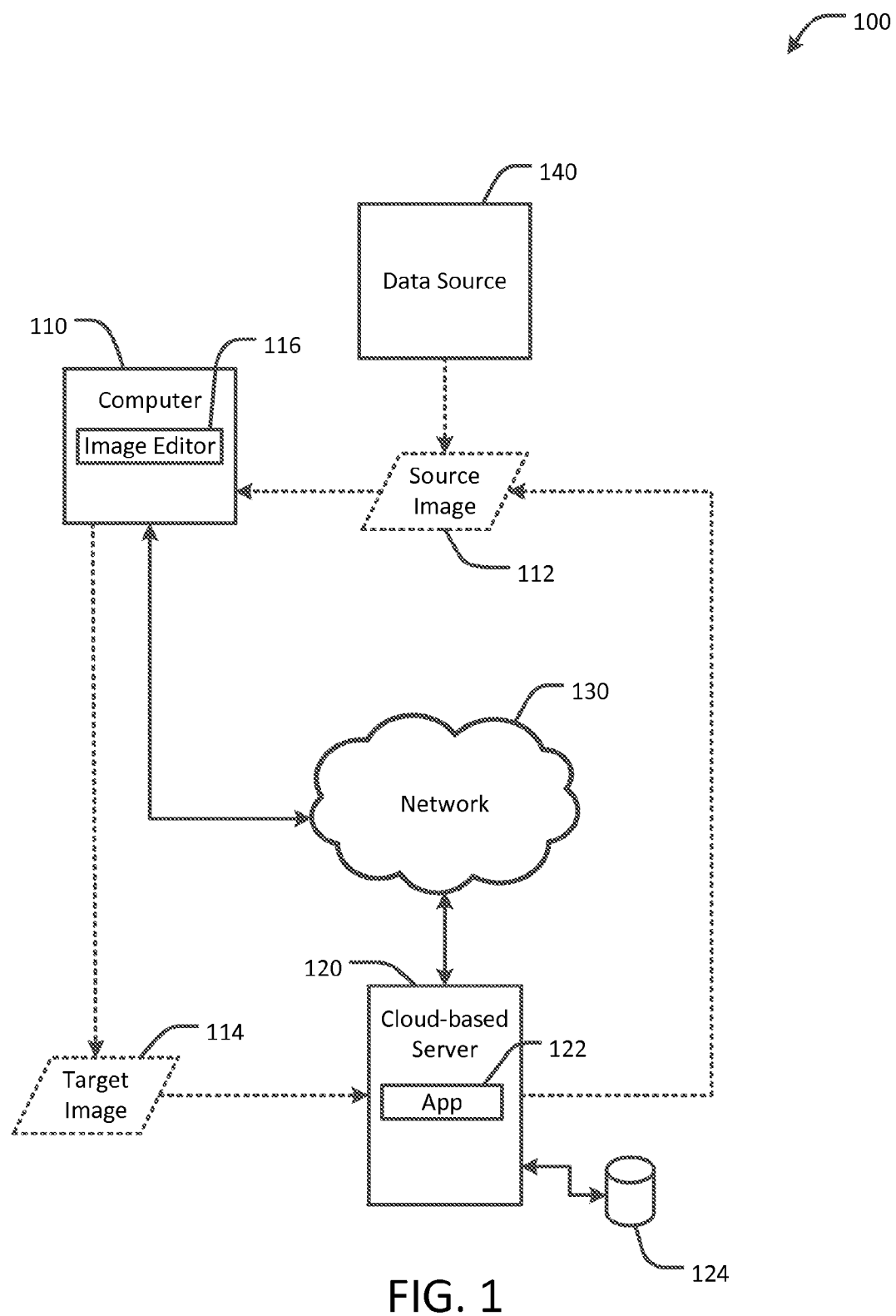
FIG. 1 illustrates an example client-server system for generating a modified image, in accordance with an embodiment of the present disclosure.

One technique for synthesizing or modifying content in a digital image or video is to partition one or more images into patches (groups of pixels), and then generate structure, texture or both by copying content from patches that are most similar to other patches in or near the region being synthesized or modified. This technique is also referred to in this disclosure as content aware fill. Similarity is a correspondence problem, which refers to the problem of ascertaining which set of points in one image are the same as (correspond to) another part of the same or a different image. Previously developed patch sampling methods employ a repeated search of some or all patches in one image region for computing patch correspondences in another image region. In other words, given images or regions A and B, the correspondence problem can be solved by finding, for every patch in A, the nearest neighbor in B under a patch distance metric. A map called nearest-neighbor field (NNF) can be used to record the result of this search operation. Solving the correspondence problem using a comprehensive, brute force search can be computationally expensive or prohibitive, particularly for large images, thus rendering this search technique less practical for its intended use in interactive image editing tools, such as Photoshop. To address this, some other existing search techniques, such as PatchMatch, reduce the computational requirements by approximating the nearest neighbors. However, these techniques remain computationally demanding and have high memory requirements, and therefore are also less practical for use with large images or while working with several different source images, such as when stitching together images to form a panoramic scene. Moreover, prior attempts to reduce computational and memory requirements involve synthesizing content from destructively down-sampled (lower resolution) images, which under certain conditions can lead to unpredictable and error-prone results.

To this end, and in accordance with an embodiment of the present invention, techniques are disclosed for generating a modified image. A source image at an original, or high, resolution is downsampled to a lower resolution. One or more mappings between different patches, or regions, of pixels within the source image or across several images are generated from the downsampled image using a patch-based sampling algorithm. One such algorithm is PatchMatch by Connelly Barnes et al. (2009); see, e.g., http://gfx.cs.princeton.edu/pubs/Barnes_2009_PAR/. Such patch-based sampling algorithms may be used find correspondences between patches of one or more images by defining a nearest-neighbor field (NNF) as a function of offsets for some distance function of the patches. If a reconstructed version of the downsampled image at the finest resolution contains one or more coherent regions, the NNF mapping is then upsampled to a higher resolution and used to identify fill content in the source image for filling patches in other portions of the image or other images corresponding to those coherent regions. The fill content is derived from regions of the source image corresponding to the coordinates of the source patch in the upsampled mapping. Applications of the patch-based sampling techniques disclosed herein include texture synthesis, image and video completion, summarization and retargeting, image recomposition and editing, image stitching and collages, new view synthesis, and noise removal. In such applications, memory is only used for the full source image, the full fill hole mask (e.g., a mask that specifies where the hole is), the full NNF, and a variable height strip of the image (e.g., variable size based on available memory). Numerous configurations and variations will be apparent in light of this disclosure.

As used in this disclosure, the term "patch" refers to a group of pixels in an image, video frame or other visually representable content. A patch can be of any size in either two or three dimensions, and an image can have any number of patches. A source patch may, for example, include a patch containing pixels that are replicated (e.g., pixels copied in either a modified or unmodified state) in a separate target patch.

As used in this disclosure, the term "mapping" refers to a representation of a function relating one patch to another. For example, pixel coordinates in a target patch may be mapped to pixel coordinates in a source patch according to a correspondence function, such as a function of offsets for a distance metric. For instance, given a patch coordinate a in image A and its corresponding nearest neighbor b in image B, the correspondence function may be an offset value equivalent to b−a. In some cases, the mapping (e.g., offsets) can be stored in an array whose dimensions are those of image A.

As used in this disclosure, the term "coherent region" refers to a group or subset of pixels that have similar color values (or other suitable characteristics) as neighboring pixels; that is, the similarly colored pixels are spatially coherent at a given resolution. For instance, in an image, particularly a photographic image, objects or discrete components in the image typically have consistent and uniform properties like colors or textures over at least a portion of their visible surfaces, and those colors may be distinct from the colors/textures of other regions in the image. For example, in an image of a tree set against a blue sky, the blue pixels representing the sky form one coherent region because there are no blue pixels on the tree, while the green or brown pixels representing the tree form one or more coherent regions distinct from the sky region since there are no green or brown pixels in the sky. Furthermore, these pixels of similar color (e.g., blue, green or brown) are coherent; that is, they are adjacent or very near to each other. By contrast, regions of the image that are not coherent have adjacent or nearby pixels with distinctly different colors. The size of a coherent region is a function of the size of the object or component in relation to the image as a whole or to a portion of the image (e.g., a quadrant, square, etc.). Thus, relatively speaking, large objects or components are represented by a large number of pixels relative to the total number of pixels (e.g., resolution) in the image, thereby forming a relatively large coherent region.

Example System

FIG. 1 illustrates an example client-server system 100 for generating a modified image, in accordance with an embodiment. The system 100 includes one or more computers 110. In some cases, the system also contains one or more servers 120, each electronically interconnected via a network 130 (e.g., a wide area network, such as the Internet, or a local area network). However, it will be understood that some embodiments can be implemented without the server 120 or network 130 (e.g., implemented entirely on computer 110). Generally, the computer 110 can be any type of device, such as a personal computer (PC), tablet, or smart phone, configured to send and receive data (e.g., a source image 112, a target image 114, or any other data) to and from the server 120 or other suitable data source 140. The computer 110 can include an image editor application 116 (e.g., Photoshop or another suitable image processing application). The server 120 can include an application 122 for serving the source image 112 and receiving the target image 114. The source image 112, target image 114, or any combination of these may be stored by the server 120 in a suitable storage, memory, database or repository 124. The storage 124 can contain one or more images, including images for using in modifying other images using the techniques described in this disclosure, images that have been so modified and images that have not been so modified. In some cases, the server 120 can be a cloud-based server. As used in this disclosure, a "cloud" refers to any client-server architecture in which at least some computation and/or data storage is relocated from a client computing system (e.g., computer 110) to one or more remote servers (e.g., server 120) that provide the computation or data storage as a commodity or utility. A cloud may, for example, include a large collection of resources that can be interchangeably provisioned and shared among many clients. For example, copies of a file (e.g., the source image 112 or the target image 114) may be stored locally and/or remotely in one or more clouds.

Figure 2A:
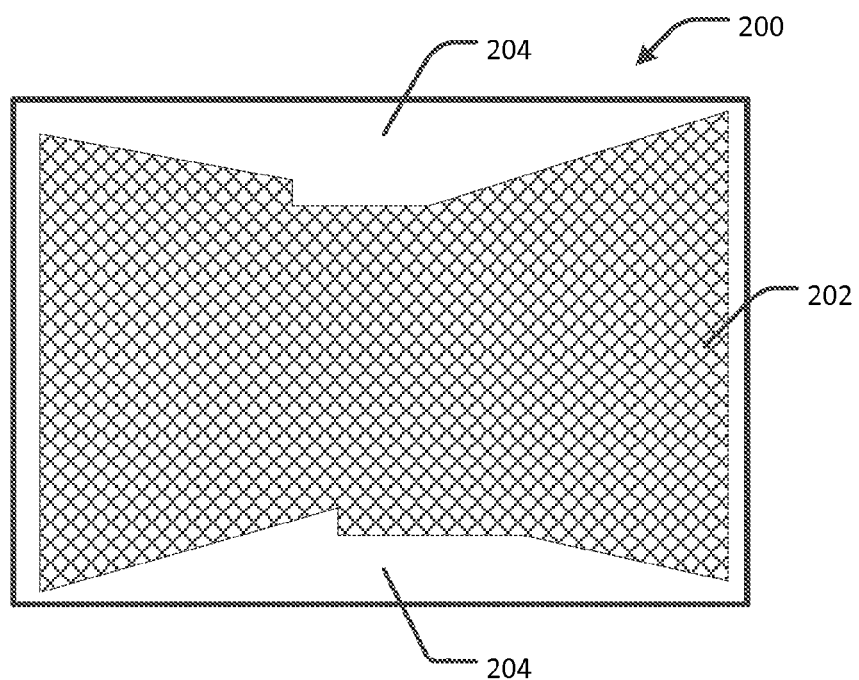
FIG. 2A depicts an example source image, in accordance with an embodiment of the present disclosure.
Figure 2B:
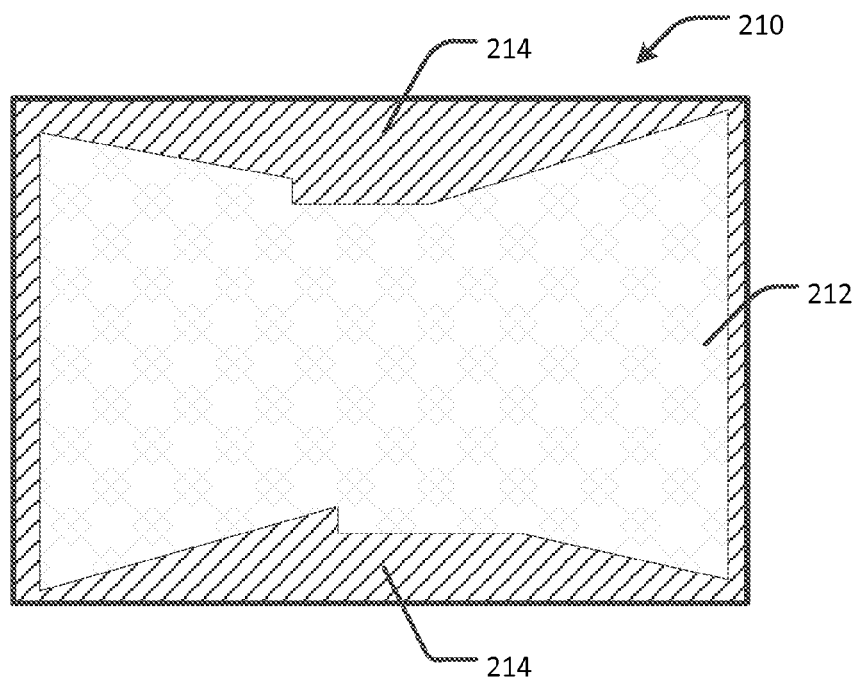
FIG. 2B depicts an example target image, in accordance with an embodiment of the present disclosure.

By way of example, the source image file 112 may include a single image file (e.g., a Photoshop (PSD) file, a Joint Photographic Experts Group (JPEG) file, or an image file having another suitable format), or a combination of several image files, such as a series of panoramic images stitched together at the edges. FIG. 2A depicts an example source image 200 in which several separate images have been combined to form one original image 202. Region 204 represents areas outside of the original image 202, which the user of the image editor 112 wishes to fill with content copied or synthesized from the original image 202 or another image source to form a target image 210, as shown in the example of FIG. 2B. The target image 210 may, for example, contain the fill content 214 in substantially the same region corresponding to the region 204 of the source image 200. In this example, the region 212 represents an unmodified or empty region of the target image 210. The target image 210 may subsequently be combined with the source image 200 to form an output image (not shown), which may include both the original image 202 and the fill content 214, thereby forming a cohesive image.

Figure 3:
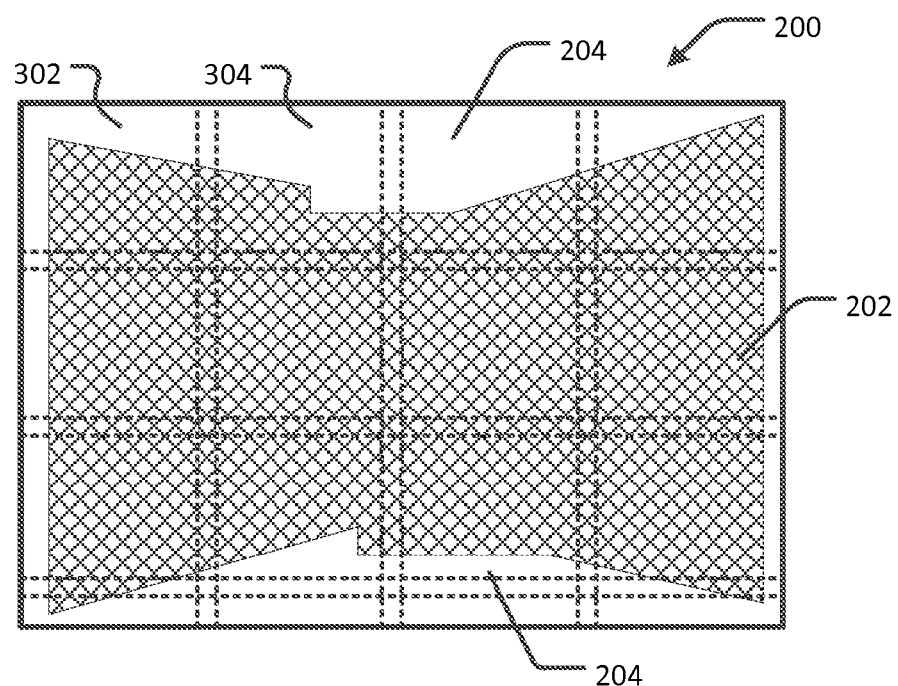
FIG. 3 depicts the example source image of FIG. 2A divided into several tiles, in accordance with an embodiment of the present disclosure.
Figure 4:
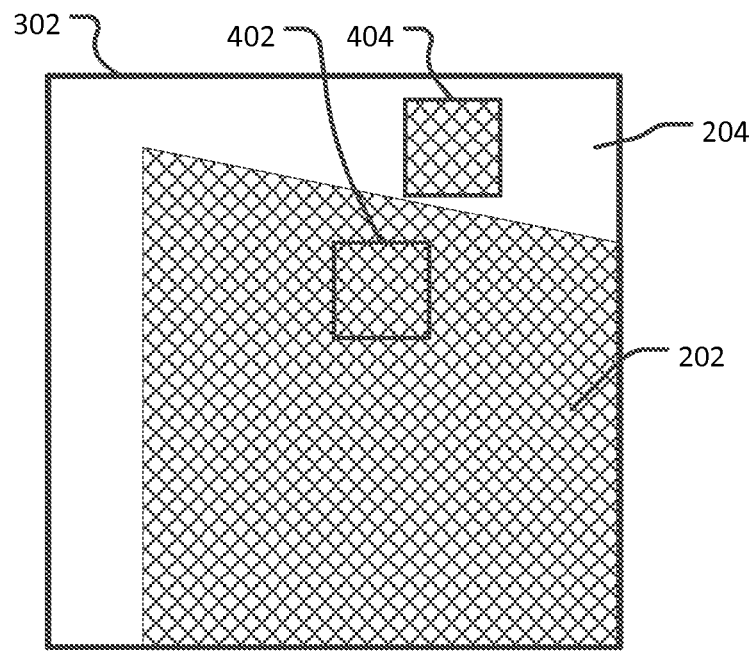
FIG. 4 depicts an example tile of the source image of FIG. 3, in accordance with an embodiment of the present disclosure.

In an embodiment, the fill content 214 can be generated using a patch-based sampling technique, such as described in this disclosure. Such a patch-based sampling technique can be used to search over a continuous translation domain using a generalized PatchMatch algorithm in a multi-resolution manner from coarse to fine resolutions. A map called nearest-neighbor field (NNF) can be used to record the result of the search operation. A NNF may, for example, be defined as a function $f:A \rightarrow \mathbb{R}^2$ of offsets, which is over all possible matches of patches (e.g., location of patch centers) in image A, for some distance function of two patches D. In this example, for a given patch coordinate a in image A and its corresponding nearest neighbor b in image B, $f(a)$ equals b−a. However, as noted above, the generalized PatchMatch algorithm (or a similar algorithm) can have very high computational and memory requirements, particularly for large combinations of images (e.g., images having more than 15000× 15000 pixels or more than 30000×20000 pixels). As such, it may not be practical to use such generalized patch matching techniques. To improve performance, the source image can be downsampled to a lower resolution prior to generating the NNF mapping. Next, the source image can be broken into overlapping tiles, such as tiles 302, 304 shown in the example of FIG. 3, and a content aware fill can be performed independently on each tile, blending the results in the overlapping areas. It will be noted that this technique uses the NNF for determining a source window for performing the content aware fill independently for each tile, and the NNF is not used in subsequent steps. FIG. 4 shows the example tile 304 of FIG. 3, in which a source patch 402 and target patch 404 are depicted. The source patch 402 can be associated with the target patch 404 by a mapping (e.g., NNF). Based on the mapping, content from the source patch 402 (e.g., color) can be used to fill the target patch 404.

In accordance with an embodiment of the present invention, it is recognized that the NNF geometric description of images reconstructed from the finest scale ($S_t$) version of the original image after downsampling is rich and sufficient enough to construct the final color values of the synthesized fill content at full (e.g., original) resolution. At finer resolutions $S_i$ (e.g., less than the full, original resolution), the NNF is formed from several large, coherent regions of the image, and pixel-to-pixel differences generally only occur at boundaries of these regions. At higher resolutions these regions become larger, and the portion of the boundaries consequently becomes smaller. Thus, in accordance with a particular embodiment, a mapping (e.g., NNF) can be generated from coherent regions of the image at finest scale after downsampling, and final pixel color values for content aware fill can be generated at a final scale directly from the original image based on an upsampled version of the low resolution mapping. In this embodiment, this technique may be performed without iteratively improving the low resolution mapping using, for example, propagation or random search techniques, such as described by Barnes et al. due at least in part to the coherency characteristics of the image at the finest scale after downsampling. In this manner, large images can be processed under low memory conditions and at a high speed by skipping the processing of one or more intermediate resolution versions of the original image, and thus reduce the amount of computational processing while providing a high quality output image. According to some embodiments, the techniques described in this disclosure can be used in conjunction with other forms of image modification, such as content aware move (e.g., moving or retargeting a portion of an image from one location to another), content aware patch (e.g., completing or filling a portion of an image with content from another portion of the image), and content aware heal (e.g., reshuffling discontinuous regions of an image to reduce or eliminate the apparent discontinuity). Other examples will be apparent in light of the present disclosure.

Example Methodologies

Figure 5:
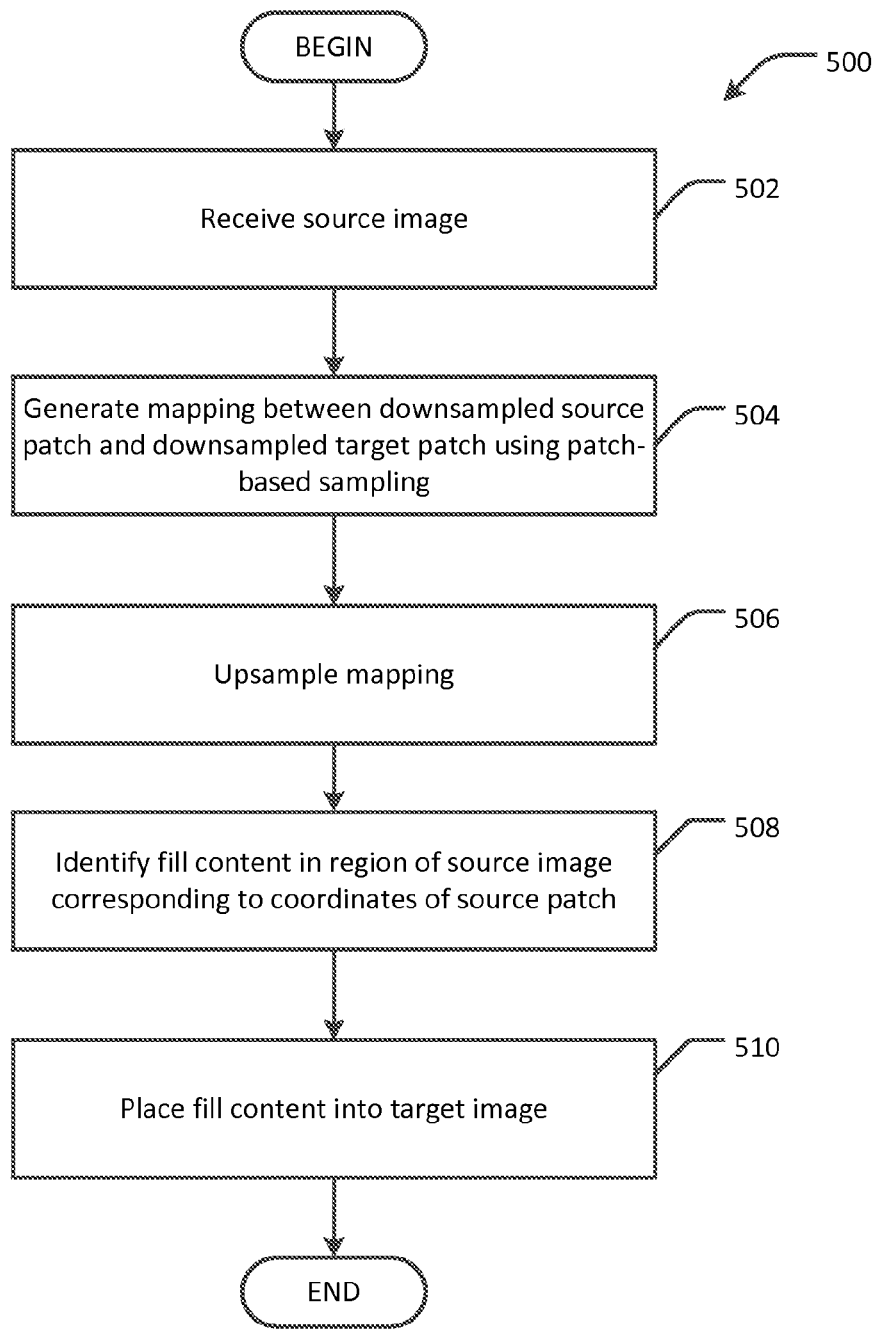
FIG. 5 is a flow diagram representative of an example methodology for generating a modified image, in accordance with an embodiment of the present disclosure.

FIG. 5 is a flow diagram of an example methodology 500 for generating a modified image, in accordance with an embodiment. The example methodology 500 may, for example, be implemented by the image editor 116 of FIG. 1. The method 500 begins by receiving (502) data representing one or more source images at an original (e.g., high) resolution. The source image(s), or portions thereof, can be used to generate a target image, as discussed below. The source image(s) may include, for example, a PSD, JPEG, or other image document. The method 500 continues by generating (504) a mapping between a source patch of pixels in a downsampled version of the source image(s) and a target patch of pixels in the downsampled version of the source image(s) using a patch-based sampling algorithm. In some embodiments, the source patch of pixels represents a coherent region of a finer resolution version of the source image(s) reconstructed from the downsampled version of the source image(s). The downsampled version of the source image(s) has a resolution coarser than the original resolution. In some embodiments, the resolution of the downsampled version of the source image(s) is determined at least in part by the amount of available memory for processing the image. Thus, the resolution of the downsampled image may be higher when a large amount of memory is available than if a small amount of memory is available. The mapping may, for example, represent an array of offset (NNF) values, such as described above. In some embodiments, to reduce memory consumption, the array can have a dimension of up to approximately 10000×10000, corresponding with the resolution of the downsampled image or a portion thereof (e.g., a tile of the image, such as tiles 302 and 304 of FIG. 3). If the source patch of pixels represents a coherent region of the finer resolution version of the source image(s), the method 500 continues by upsampling (506) the mapping to a resolution finer than the resolution of the downsampled mapping. The method 500 continues by identifying (508) fill content in a region of the original resolution source image corresponding to coordinates of the source patch of pixels in the upsampled mapping. In this manner, at least the color values in the original resolution source image(s) can be used to fill portions of the target image based on the upsampled (coarser) resolution mapping. The method 500 continues by placing (510) the fill content into a target image. In some cases, the fill content can be placed into the target image using an area averaging technique (e.g., by using the average color, intensity, texture or other characteristic of the respective pixels). Subsequently, the target image and the source image can be merged into a single output image.

In some embodiments, a mask is generated for the target image. The mask can be used for constraining portions of the target image into which the fill content may be placed (e.g., holes in the image that are to be filled), or, additionally or alternatively, portions of the target image into which the fill content may not be placed. In some embodiments, the method includes copying, averaging, or both, pixel colors from a region of the original resolution source image corresponding to at least a portion of the source patch. In some embodiments, the method 500 can be modified by repeating the steps of generating the mapping (504), upsampling the mapping (506), and identifying fill content (508) for a plurality of overlapping sections or strips of the source and target images.

Example Computing Device

Figure 6:
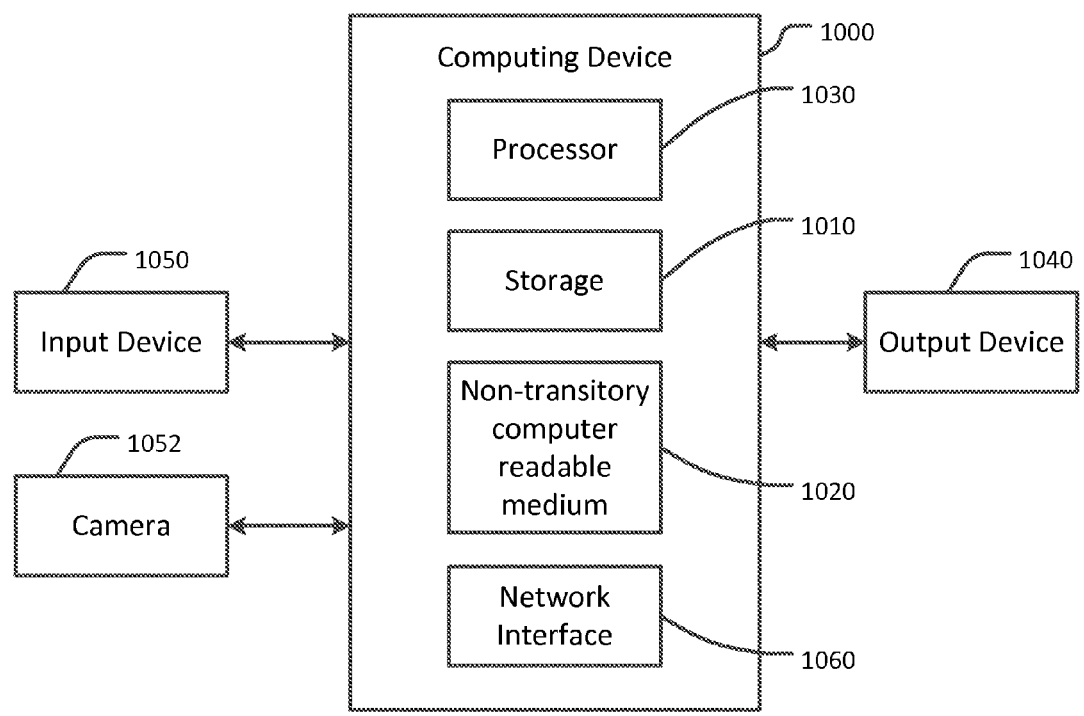
FIG. 6 is a block diagram representing an example computing device that may be used in accordance with an embodiment of the present invention.

FIG. 6 is a block diagram representing an example computing device 1000 that may be used to perform any of the techniques as variously described in this disclosure. For example, the computer 110, server 120, or any combination of these (such as described with respect to FIG. 1) may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals. The computing device 1000 can include and/or be operatively coupled to various suitable devices for performing one or more of the functions as variously described in this disclosure. For instance, the computing device may include or be operatively coupled to a camera 1052, and a network interface 1060 for communicating with other devices via a network, such as the Internet.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the image editor 116 and application 122, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computer 110 and the server 120, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving a source image at an original resolution; generating, using a patch-based sampling algorithm, a mapping between a source patch of pixels in a downsampled version of the source image and a target patch of pixels in the downsampled version of the source image, the downsampled version of the source image having a resolution coarser than the original resolution; upsampling the mapping to a resolution finer than the resolution of the downsampled version of the source image; identifying fill content in a region of the original resolution source image corresponding to coordinates of the source patch of pixels in the upsampled mapping; and placing the fill content into a target image. In some cases, the source patch of pixels represents a coherent region of a finer resolution version of the source image reconstructed from the downsampled version of the source image. In some cases, the process includes combining the source image and the target image to produce an output image. In some cases, the identifying of the fill content includes at least one of copying and averaging pixel colors from a region of the original resolution source image corresponding to at least a portion of the source patch. In some cases, the process includes repeating the generating, upsampling and identifying for each of a plurality of overlapping portions of the source image. In some cases, the method includes storing the mapping in an array. In some cases, the array has a dimension of up to approximately 33,000 by 33,000. In some cases, the process includes generating a mask for constraining at least one of: portions of the target image into which the fill content may be placed, and portions of the target image into which the fill content may not be placed. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
receiving, by a processor, a source image at an original resolution;
generating, using a patch-based sampling algorithm, a patch coordinate map between a source patch of pixels in a downsampled version of the source image and a target patch of pixels in the downsampled version of the source image, the downsampled version of the source image having a resolution coarser than the original resolution;
upsampling the patch coordinate map to a resolution finer than the resolution of the downsampled version of the source image;
identifying fill content in a region of the original resolution source image corresponding to coordinates of the source patch of pixels in the upsampled patch coordinate map; and
placing the fill content into a target image at the original resolution.

2. The method of claim 1, wherein the source patch of pixels represents a coherent region of a finer resolution version of the source image reconstructed from the downsampled version of the source image.

3. The method of claim 1, further comprising combining the source image and the target image to produce an output image.

4. The method of claim 1, wherein the identifying of the fill content includes at least one of copying and averaging pixel colors from a region of the original resolution source image corresponding to at least a portion of the source patch.

5. The method of claim 1, further comprising repeating the generating, upsampling and identifying for each of a plurality of overlapping portions of the source image.

6. The method of claim 1, further comprising storing the mapping in an array.

7. The method of claim 6, wherein the array has a dimension of up to approximately 33,000 by 33,000.

8. The method of claim 1, further comprising generating a mask for constraining at least one of: portions of the target image into which the fill content may be placed, and portions of the target image into which the fill content may not be placed.

9. A system comprising:
a storage;
a processor operatively coupled to the storage, the processor configured to execute instructions stored in the storage that when executed cause the processor to carry out a process comprising:
receiving a source image at an original resolution;
generating, using a patch-based sampling algorithm, a patch coordinate map between a source patch of pixels in a downsampled version of the source image and a target patch of pixels in the downsampled version of the source image, the downsampled version of the source image having a resolution coarser than the original resolution;
upsampling the patch coordinate map to a resolution finer than the resolution of the downsampled version of the source image;
identifying fill content in a region of the original resolution source image corresponding to coordinates of the source patch of pixels in the upsampled patch coordinate map; and
placing the fill content into a target image at the original resolution using an area averaging.

10. The system of claim 9, wherein the source patch of pixels represents a coherent region of a finer resolution version of the source image reconstructed from the downsampled version of the source image.

11. The system of claim 9, wherein the process includes combining the source image and the target image to produce an output image.

12. The system of claim 9, wherein the identifying of the fill content includes at least one of copying and averaging pixel colors from a region of the original resolution source image corresponding to at least a portion of the source patch.

13. The system of claim 9, wherein the process includes repeating the generating, upsampling and identifying for each of a plurality of overlapping portions of the source image.

14. The system of claim 9, wherein the process includes storing the mapping in an array.

15. The system of claim 9, further comprising generating a mask for constraining at least one of: portions of the target image into which the fill content may be placed, and portions of the target image into which the fill content may not be placed.

16. A non-transient computer program product having instructions encoded thereon that when executed by one or more processors cause a process to be carried out, the process comprising:
receiving a source image at an original resolution;
generating using a patch-based sampling algorithm, a patch coordinate map between a source patch of pixels in a downsampled version of the source image and a target patch of pixels in the downsampled version of the source image, the downsampled version of the source image having a resolution coarser than the original resolution;
upsampling, by the processor, the patch coordinate map to a resolution finer than the resolution of the downsampled version of the source image;
identifying, by the processor, fill content in a region of the original resolution source image corresponding to coordinates of the source patch of pixels in the upsampled patch coordinate map; and
placing, by the processor, the fill content into a target image at the original resolution.

17. The computer program product of claim 16, wherein the source patch of pixels represents a coherent region of a finer resolution version of the source image reconstructed from the downsampled version of the source image.

18. The computer program product of claim 16, wherein the process includes combining the source image and the target image to produce an output image.

19. The computer program product of claim 16, wherein the identifying of the fill content includes at least one of copying and averaging pixel colors from a region of the original resolution source image corresponding to at least a portion of the source patch.

20. The computer program product of claim 16, wherein the process includes repeating the generating, the upsampling and the identifying for each of a plurality of overlapping portions of the source image.

* * * * *